(12) United States Patent
Geyer et al.

(10) Patent No.: US 11,053,835 B2
(45) Date of Patent: Jul. 6, 2021

(54) METHOD AND SYSTEM FOR ASSESSING ENGINE FAULTS

(71) Applicants: VOLVO TRUCK CORPORATION, Gothenburg (SE); Stephen Geyer, Greencastle, PA (US); Dale Hoover, McConnellsburg, PA (US)

(72) Inventors: Stephen Geyer, Greencastle, PA (US); Dale Hoover, McConnellsburg, PA (US)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/980,388

(22) PCT Filed: May 10, 2018

(86) PCT No.: PCT/US2018/032125
§ 371 (c)(1),
(2) Date: Sep. 12, 2020

(87) PCT Pub. No.: WO2019/216901
PCT Pub. Date: Nov. 14, 2019

(65) Prior Publication Data
US 2021/0087962 A1    Mar. 25, 2021

(51) Int. Cl.
*F01N 9/00* (2006.01)
*F02D 41/02* (2006.01)
*F01N 3/023* (2006.01)

(52) U.S. Cl.
CPC .......... *F01N 9/002* (2013.01); *F02D 41/029* (2013.01); *F01N 3/023* (2013.01); *F01N 2560/05* (2013.01); *F01N 2900/1606* (2013.01); *F02D 2200/0812* (2013.01)

(58) Field of Classification Search
CPC ...... F01N 9/002; F01N 3/023; F01N 2560/05; F01N 2900/1606; F02D 41/029; F02D 2200/0812
USPC .......................................................... 60/295
See application file for complete search history.

(56) References Cited

U.S. PATENT DOCUMENTS

| 5,497,099 A | 3/1996 | Walton |
| 7,628,007 B2 | 12/2009 | Kittelson et al. |
| 2008/0155964 A1 | 7/2008 | Kilkenny |
| 2010/0005784 A1* | 1/2010 | Bird ...................... F02D 41/029 60/284 |
| 2010/0101409 A1* | 4/2010 | Bromberg ............. F01N 13/009 95/8 |

(Continued)

FOREIGN PATENT DOCUMENTS

| WO | 2013074023 A1 | 5/2013 |
| WO | 2015090342 A1 | 6/2015 |

OTHER PUBLICATIONS

International Search Report dated Jul. 12, 2018 for corresponding International App. PCT/US2018/032125.

*Primary Examiner* — Mahmoud Gimie
(74) *Attorney, Agent, or Firm* — WRB-IP LLP (57) ABSTRACT

A method and system are provided for assessing engine faults. The method includes measuring actual diesel particulate filter (DPF) soot loading, determining expected DPF soot loading, aid determining that a possible engin component fault is an actual engine component fault by determining that measured actual DPF soot loading exceeds the expected DPF soot loading.

24 Claims, 3 Drawing Sheets

(56) References Cited

U.S. PATENT DOCUMENTS

| | | | |
|---|---|---|---|
| 2012/0125081 A1* | 5/2012 | Yadav | F02D 41/221 |
| | | | 73/23.33 |
| 2014/0123608 A1 | 5/2014 | Sun et al. | |
| 2015/0167517 A1 | 6/2015 | Dong et al. | |
| 2017/0182447 A1 | 6/2017 | Sappok et al. | |

* cited by examiner

METHOD AND SYSTEM FOR ASSESSING ENGINE FAULTS

BACKGROUND AND SUMMARY

The present invention relates generally to methods and systems for assessing diesel engine faults and, more particularly, to assessing diesel engine faults based on diesel particulate filter (DPF) soot loading.

Modern diesel engines are typically provided with exhaust aftertreatment systems (EATS). A typical EATS will include diesel oxidation catalyst (DOC), a DPF, and a selective catalytic reduction catalyst (SCR). Soot loading in the DPF is typically determined by a soot oxidation model embodied in processing circuitry and based on extensive testing of the engine model in question under various operating and load conditions. Soot loading in the DPF is also typically measured by techniques such as determining the pressure drop across the DPF. When the soot oxidation model or soot loading measurement techniques determine that the soot loading of the DPF has reached a predetermined level, a regeneration will be performed.

Most techniques for measuring soot loading in a DPF, such as techniques relying on pressure drop across a DPF, are notoriously imprecise and do not properly account for the type of loading. For example, whether the loading involves substrate surface loading of pores or plugging of pores can significantly impact the actual loading of the DPF. Excessive soot production, often the result of malfunction of combustion related engine components, may not be detected by these techniques, or may not be detected in a sufficiently timely manner. The pressure drop method also cannot distinguish between soot loading or ash loading.

The soot oxidation model will ordinarily not account for engine component failure. For components related to combustion, it is important to know the actual status of the components to ensure that excessive soot production does not occur. For example, a broken injector can put extra raw fuel into the exhaust system which can produce excessive soot or face plugging of a DOC. A boost air system malfunction such as a broken turbocharger or a leak in the piping for the boost air reduces the available combustion air, which generates high soot levels. A malfunctioning exhaust gas recirculation (EGR) system can also reduce the amount of available air for combustion of the fuel and produce excessive soot. In short, there are many engine component malfunctions that can generate excessive rates of soot buildup.

Excessive soot generation can result in a DPF becoming too full before regeneration occurs, or can result in frequent or incomplete regenerations. Frequent or incomplete regenerations can indicate poisoning of a DOC or a DPF. If a regeneration occurs when the filter is too full (or over full), the heat generated can result in a cracked DPF filter from excessive high temperatures or in extreme cases the rate of heat generation may be so fast and so intense that it will melt the ceramic core of the DPF. In both cases the damaged DPF will allow soot to escape the filter into the atmosphere. The escaping soot may also damage the SCR downstream of the DPF. It is important to prevent the DPF from being damaged to avoid damage and other subsequent expensive repairs.

The inventors have recognized that the soot loading or soot loading rate on the DPF can be used to determine if engine component failures were responsible for excessive loading or loading rates. Significantly higher loads than expected or fast load rate increases are generally a result of engine component failures. Higher loads, but not necessarily significantly higher loads, and slower rate increases are generally a result of component deterioration and system drift. Immediate action must be taken to prevent DPF damage from soot overload and regenerations at high soot load condition. Engine malfunction due to faulty components can also result in a high soot output condition. There are many engine malfunctions which can generate excessive rates of soot buildup which the soot oxidation model cannot capture and existing DPF soot sensors do not respond fast enough to prevent DPF damage. Most DPF soot sensors are implemented after (downstream of) the DPF to detect soot bypassing the DPF and, thus, only detect excessive soot after damage such as overloading of the DPF has already occurred. Consequently, it is not infrequent that DPF are regenerated with incorrect soot loading information, which can cause high heat conditions and broken DPFs.

Many combustion components on modern diesel engines are monitored and send fault signals to processing circuitry to provide warnings of potential component failure. Further, notifications of software function controllability failure for components such as EGR and turbocharger systems can be indicative of a component failing to respond properly to a control command. Fault signals for potential component failure can be highly useful to avoid overloading DPFs with soot and related problems. While it is important to know the functional status of engine components, it is not uncommon for fault signals to be false warnings, such as due to poor calibration or poorly designed software diagnostic functions. Additionally, many diagnostics tools diagnose problems from an "inferred" point of view, i.e. other measureable engine effects are observed as they relate to a component's operation and, if the effects do not follow the component's changes in some way, a fault may be diagnosed. Such inferred diagnostic arrangements often result in intermittent fault signals and go back and forth from indicating a fault to not indicating a fault until there is sufficient failure to more definitively diagnose a problem. Accordingly, warnings to which attention should be paid may be ignored and may result in excessive soot production, while false warnings may be heeded and unnecessary servicing may be undertaken.

It is desirable to provide an improved technique for assessing whether detected possible engine component faults are actual faults or false warnings. It is also desirable to prevent avoidable failure of DPFs by early detection of excessive soot loading.

In accordance with an aspect of the present invention, a method for assessing engine faults comprises measuring actual DPF soot loading, determining expected DPF soot loading, and determining that a possible engine component fault is an actual engine component fault by determining that measured actual DPF soot loading exceeds the expected DPF soot loading.

In accordance with another aspect of the present invention, a system for assessing engine faults comprises means for measuring actual DPF soot loading, and processing circuitry configured for determining expected DPF soot loading, wherein the processing circuitry is configured for determining that a possible engine component fault is an actual engine component fault by determining that measured actual DPF soot loading exceeds the expected DPF soot loading.

In accordance with another aspect of the present invention, a method for assessing engine faults comprises measuring actual DPF soot loading, determining expected DPF soot loading, monitoring one or more engine components for faults and sending a fault signal upon detection of a possible engine component fault, and determining that one or more monitored engine components are performing sub-optimally without causing sending of a fault signal by determining that measured actual DPF soot loading exceeds the expected DPF soot loading.

In accordance with yet another aspect of the present invention, a system for assessing engine faults comprises means for measuring actual DPF soot loading, processing circuitry configured for determining expected DPF soot loading, and means for monitoring one or more engine components for faults and for sending a fault signal to the processing circuitry upon detection of a possible engine component fault, wherein the processing circuitry is configured for determining that one or more monitored engine components are performing sub-optimally without causing sending of a fault signal by determining that measured actual DPF soot loading exceeds the expected DPF soot loading.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
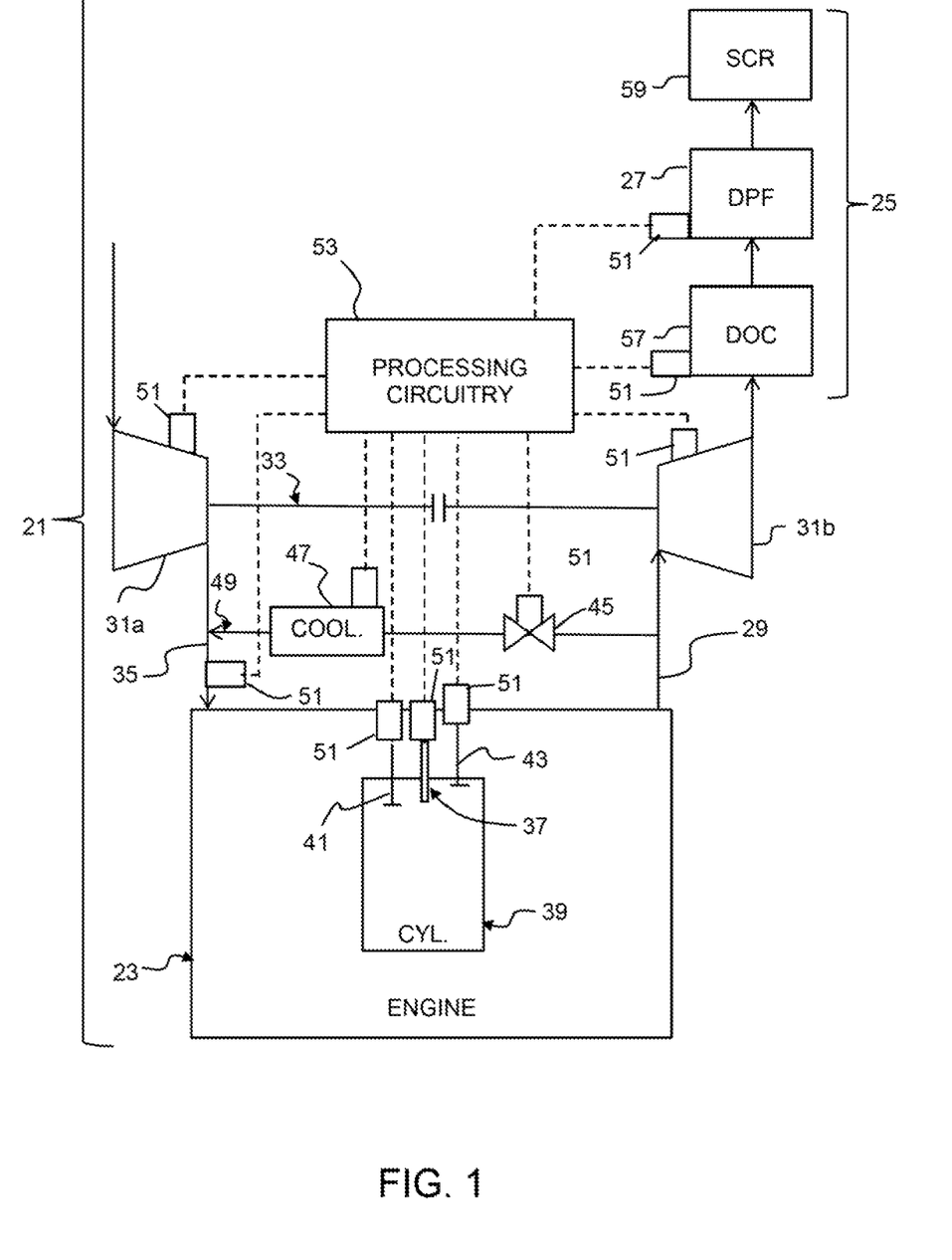
FIG. 1 is a schematic view of an engine including a system according to an aspect of the present invention.

A system 21 for assessing engine faults is shown in FIG. 1. The system 21 is used in conjunction with a diesel engine 23 comprising an exhaust after-treatment system 25 (EATS) that includes a DPF 27 in an exhaust line 29 downstream of the engine. The EATS 25 will ordinarily include other components, as well, such as a diesel oxidation catalyst 57 (DOC) and a selective catalytic reduction catalyst 59 (SCR). It is presently anticipated that the system will be primarily of use for assessing the severity of functional faults relating to the functioning of components involved in combustion, such as, but not limited to, functioning of compressors 31a (such as in a variable geometry turbocharger 33 comprising an associated turbine 31b in the exhaust line 29) for providing boost pressure in an intake line 35 upstream of the engine 23, fuel injectors 37 for providing fuel to cylinders 39 of the engine, timing of opening of cylinder intake valves 41 and cylinder exhaust valves 43 for controlling, inter alia, combustion and power, and exhaust gas recirculation (EGR) equipment such as EGR valves 45 and EGR coolers 47 in EGR lines 49.

The functioning of combustion related components is monitored by suitable means for monitoring, such as via sensors 51, in a known manner and fault indication information relating to possible malfunctions of these components is transmitted to suitable processing circuitry 53 such as a controller or processor, such as an ECU. The inventors have recognized that malfunctioning of many components associated with combustion tends to alter the amount and rate of soot production by the engine 23 and that this information can be useful in determining the severity of a malfunction identified by a fault indication and/or in diagnostics of problems such as worn components where fault indications may not occur but altered soot production does occur.

Figure 2:
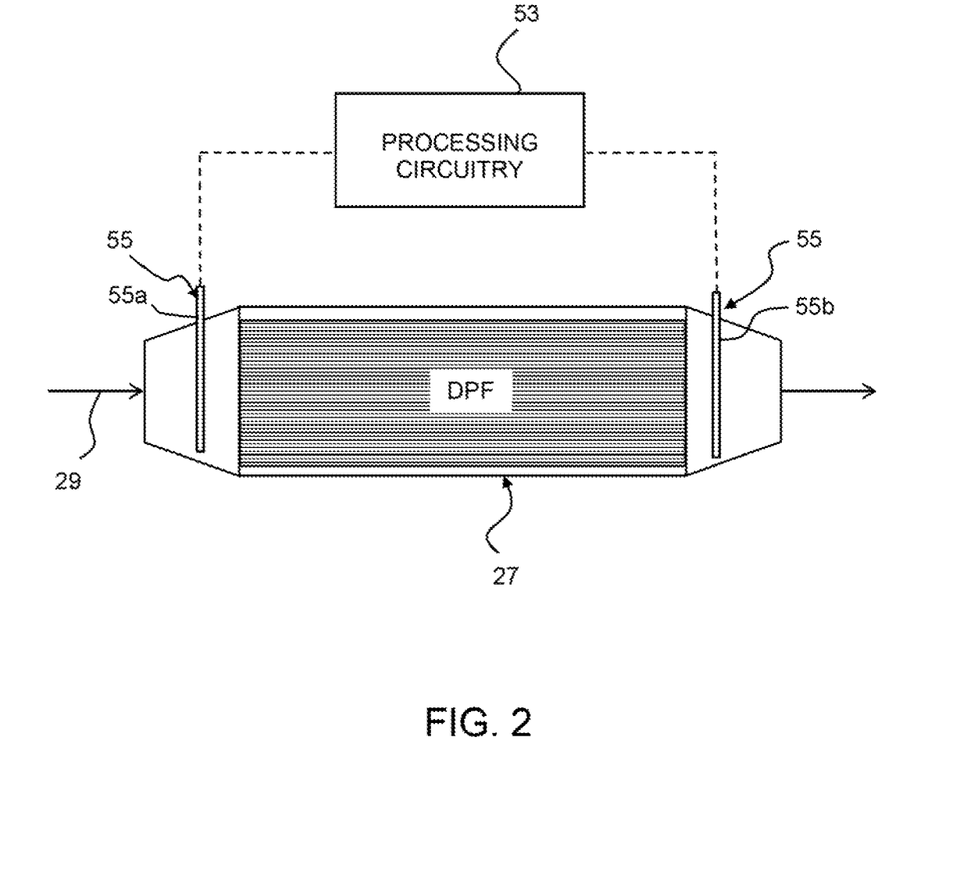
FIG. 2 is a schematic view of a DPF including an RF sensor and processing circuitry configured to establish soot loading/loading rate in the DPF.

An illustrative but not necessarily complete list of various component failures or fault signals that can be monitored and can cause or be symptomatic of excessive soot loading or an excessively fast soot loading rate are:
Injector/Common Rail issues:
  leaking injectors
  injector pressure control problems
  injection quantity control problems
Combustion issues:
  idle control problems
  combustion temperature control problems related to EATS functionality
  too little air for complete combustion
Turbocharger issues:
  air system problems due to poor turbocharger performance
Variable Geometry Turbine issues:
  air system problems resulting for poor turbocharger performance
  lack of response from vane control
  turbocharger not running at correct boost level or wheel speed response
Air system issues:
  intake temperature not at proper level
  air system has leaks or restriction
EGR system issues:
  unable to reach targeted EGR flow rates
  air-to-fuel ratio not maintained for complete combustion
  EGR differential sensor problems
  unable to maintain closed loop control as expected
Intake throttle issues:
  intake throttle system problem
  EATS temperature control not adequate
  cold start control problems
EATS issues:
  engine problems translating into insufficient heat in the EATS for it to maintain soot load levels
  closed loop control not maintained
  cold start strategy not maintained
Aftertreatment hydrocarbon injector (AHI) (face plugging) issues:
  improper hydrocarbon dosing
  closed loop control not maintained
  regeneration of DPF not possible
  cold start strategy not maintained FIG. 2 shows means 55 provided for measuring actual soot loading in the DPF 27. In a presently preferred embodiment, the means for measuring actual soot loading comprises an RF sensor arrangement that is configured to sense a "difference" in microwave spectrum signal between a transmitted microwave signal and the received reflected microwave signal. RF sensors suitable for use in connection with the present invention are manufactured by CTS Corp. https://www.ctscorp.com/products/sensors-2/rf-dpf-sensor/ Other non-destructive techniques that can establish soot loading in real time in a DPF, such as via X-rays, such that that information can be related in real time to exhaust mass flow through the DPF can also or alternatively be used. Alternative techniques might include an improved pressure drop sensor, an ionization soot detection sensor before the DPF, a laser or optical sensor, or an ultrasound sensor.

With the RF sensor arrangement, the signals can be transmitted from and received by one and the same antenna unit (i.e. a first antenna unit). If more than one antenna is installed, differences in microwave spectrum signal between the transmitted microwave signal from a first antenna unit 55a and a received microwave signal received by a second (or third) antenna unit 55b can be detected. By using processing circuitry, any one of these differences can be translated to the degree of soot loading in the DPF 27 by a predetermined algorithm. Microwaves are a form of electromagnetic radiation with wavelengths ranging from as long as one meter to as short as one millimeter, or equivalently, with frequencies between 300 MHz (0.3 GHz) and 300 GHz. Radio frequency (RF) is a rate of oscillation in the range of about 3 kHz to 300 GHz.

In an RF sensor arrangement for use in connection with the present invention, the signal transmitted from an antenna unit is typically within a bandwidth having a predetermined radio frequency. Alternatively, a plurality of signals may be transmitted by the antenna unit having different predetermined frequencies. By knowing the radio frequency of the transmitted signal, it becomes possible to determine a difference between the transmitted signal and the received reflected signal, or the received signal. This analysis is typically carried out by the processing circuitry.

The "difference" between transmitted signals and received reflected signals or received signals may correspond to a difference in pulse, a difference in amplitude, a difference in phase, and/or a difference in spectrum energy. Alternatively, the difference may correspond to a difference in attenuation. More specifically, the "difference" may refer to a difference between the magnitude of the amplitude of the transmitted microwave and the magnitude of the amplitude of the received reflected microwave. Analogously, the "difference" may refer to a difference between the magnitude of the amplitude of the transmitted microwave and the magnitude of the amplitude of the received microwave. Analogously, the "difference" may refer to a difference between the pulse of the transmitted microwave and the pulse of the received reflected microwave, or the received microwave. For instance, a predetermined point, such as a valley or peak, of a pulse of the transmitted signal is compared with the location of the predetermined point of a pulse of the received reflected signal. Analogously, a predetermined point, such as a valley or peak, of a pulse of the transmitted signal is compared with the location of the predetermined point of a pulse of the received signal. That is, the change in pulse is determined between the transmitted signal and the received reflected signal, or received signal. Accordingly, by analyzing the amplitude, attenuation and/or phase changes at a given frequency or preferably at multiple frequencies, it becomes possible to determine a difference between the received microwave and the transmitted microwave.

The processing circuitry 53 and the term "processing circuitry" may refer to a control unit and/or may include a microprocessor, microcontroller, programmable digital signal processor or another programmable device. The processing circuitry 53 may also, or instead, include an application specific integrated circuit, a programmable gate array or programmable array logic, a programmable logic device, or a digital signal processor. Where the processing circuitry includes a programmable device such as the microprocessor, microcontroller or programmable digital, signal processor mentioned above, the processor may further include computer executable code that controls operation of the programmable device.

Typically, the processing circuitry 53 may determine the difference based on a spectral analysis of the received RF signal by analyzing the amplitude and/or phase at different frequencies. By detecting changes in the amplitude and/or phase at selected frequencies, the processing circuitry 53 is capable of comparing the transmitted signal with the received signal.

In the case of a sweeping frequency signal, the processing circuitry can utilize all or a portion of the frequencies in the swept range for the purpose of performing the signal analysis. In the case of a composite RF signal with larger bandwidth, the processing circuitry may be connected to a set of one or more filters, such as bandpass filters, for filtering out interesting portions of the received composite RF signal and use these frequency portions in the spectrum analysis.

The difference can be determined based on a comparison of a current spectrum value (amplitude/phase at one or more frequencies or ratio of amplitude/phase at multiple frequencies) of the received signal and a previously determined spectrum value of the transmitted signal. The previously determined spectrum value of the transmitted signal can be based on a spectrum analysis at a previous time instance.

By analysis of the difference(s) between one or more transmitted signals and one or more received signals, parameters for the soot loading in the DPF can be established that can be used in an algorithm to determine soot loading. The parameters for soot loading in the DPF will ordinarily be established empirically for particular types of DPF and DPF housing installations based on extensive test data in conjunction with different signal data corresponding to particular levels of soot loading. Thus, by analysis of signal data for a given DPF of the same type, it will be possible to determine parameters for soot loading.

The processing circuitry 53 can also be configured for determining expected DPF soot loading. The expected DPF soot loading can be determined by the processing circuitry 53 in any one or more of various known ways for determining expected soot loading, such as based on at least one of a combustion model, a soot oxidation loading model, a soot loading map, and computer learned or machine learned soot production expectations (e.g., artificial intelligence) that determines expected soot loading for the particular filter by determining soot loading based on previous experiences or learnings under various engine loading applications.

The processing circuitry 53 is configured for determining that a possible engine component fault, i.e. a fault indication from the monitoring equipment, is an actual engine component fault by determining that measured actual DPF soot loading exceeds the expected DPF soot loading. In this way, a distinction is made between fault indications that might be due to, e.g., false readings and those that likely represent real equipment malfunctions. While an actual fault might be determined any time that there is a fault indication from the monitoring equipment together with the measured actual DPF soot loading exceeding the expected DPF soot loading, it will in some circumstances be desirable to further characterize actual fault determinations as "true" faults when there is a fault indication from the monitoring equipment together with the measured actual DPF soot loading exceeding the expected DPF soot loading by an amount equal to or greater than a predetermined threshold. This can help in avoiding false determinations of component faults. The threshold can be set to any value that is considered to be sufficient to establish that the difference between measured actual DPF soot loading and expected DPF soot loading reflects a malfunctioning component, typically to some value that is sufficient to distinguish circumstances in which measured actual DPF soot loading exceeds the expected DPF soot loading by only a small amount, may be a false indication of a fault, and that may occur due to, e.g., minor variations in operating conditions, such as differences of about X % or less, from circumstances in which a difference between measured actual DPF soot loading exceeds the expected DPF soot loading to a degree that is unlikely to be due to any cause other than a malfunctioning component, i.e. a true fault, such as about by about Y %, where Y is greater than X. The actual percent difference is presently expected to ordinarily be set after empirical testing to determine the settings for a window within which the soot loading is acceptable or is not acceptable outside of that window. The window can define a good component, a worn or failing component, and a faulty component. For example, a bottom region, e.g., below a first threshold, of a window might indicate no faults, a middle range region, e.g., above the first threshold, might indicate excessive wear or a failing component, and an upper region, e.g., above a higher threshold, might indicate a failed component.

Ordinarily, the determination that the measured actual DPF soot loading exceeds the expected DPF soot loading will comprise comparing a rate of measured actual DPF soot loading to a rate of expected DPF soot loading, usually over a predetermined limited time interval. While malfunctioning combustion-components can be identified by comparing measured actual DPF soot loading to expected DPF soot loading, comparing a rate of measured actual DPF soot loading to a rate of expected DPF soot loading over a limited time interval can facilitate more quickly recognizing malfunctioning combustion-related components. For example, in an embodiment that will be referred to for purposes of illustration, it might be desirable to select an appropriate interval over which to check rate of DPF soot loading depending upon the particular component for which a fault is indicated, such as an interval (say, for purposes of illustration, 5-10 minutes) which might be expected to be appropriate for most components to ensure that a malfunctioning component is not permitted to cause excessive damage. Ordinarily, however, the method and system will constantly monitor soot load in the DPF and soot loading rate, and will, e.g., constantly compare soot loading rate to an expected soot loading rate window. If and when a component fault is pending, an almost instant response to the pending fault can be provided upon comparison of the measured actual DPF soot loading rate to the expected soot loading rate window and determination of the severity, if any, of the difference between the rates. As measured actual DPF soot loading rate goes from a "green" bottom region of a window in which measured actual DPF soot loading (or soot loading rate) does not exceed expected DPF soot loading (or soot loading rate), or does not exceed it beyond a first threshold, to a "yellow" middle region of the window in which measured actual DPF soot loading (or soot loading rate) does exceed expected DPF soot loading (or soot loading rate) beyond the first threshold, another strategy can be implemented to match component changes with matching soot loading rate changes to help to identify components with excessive wear or pending failure, even though the components may not have completely failed yet.

Upon a determination that an actual fault is a "true" fault, i.e. measured actual DPF soot loading (or soot loading rate) does exceed expected DPF soot loading (or soot loading rate) beyond a threshold higher than the first threshold for identifying a possible fault as an actual fault, the processing circuitry 53 will ordinarily be configured to take immediate action appropriate to restrict engine operation to avoid engine failure. The immediate action may comprise at least one of shutting the engine 23 down and/or notifying an operator of a true fault and of a severity of the true fault.

Similarly, upon characterizing a determined actual engine component fault as a non-major fault, i.e. measured actual DPF soot loading (or soot loading rate) exceeds expected DPF soot loading (or soot loading rate) beyond the first threshold, the processing circuitry 53 can be configured to respond to the determination that the determined actual engine component fault is a non-major fault by taking mitigating action appropriate to ensure correction of the non-major fault. For example, the operator may be notified of the need for maintenance by one or more of an appropriate warning, performing a regeneration of the DPF, and/or performing an inspection of the engine and EATS.

Upon characterizing a possible engine fault as a "false" fault, i.e. measured actual DPF soot loading (or soot loading rate) does not exceed expected DPF soot loading (or soot loading rate), or does not exceed it beyond the first threshold, mitigating action can be taken such as to record the false fault indication via processing circuitry such as an ECU, and preventing notification of the operator of the possible fault.

The processing circuitry 53 can also be configured to control the engine 23 to operate at a plurality of different engine loading conditions or vehicle applications, such as driving on a flat, driving uphill, driving downhill, etc., and the means 55 for measuring actual DPF soot loading can measure actual DPF soot loading at the different engine loading conditions, the processing circuitry can be configured to determine expected DPF soot loading at the different engine loading conditions, and the processing circuitry can be configured for determining that the possible engine component fault is an actual engine component fault by determining that measured actual DPF soot loading exceeds the expected DPF soot loading (and, more preferably, measured actual DPF soot loading rate exceeds the expected DPF soot loading rate) at the different engine loading conditions at the different engine loading conditions. Operating the engine at different loading conditions and determining that measured actual DPF soot loading exceeds the expected DPF soot loading at the different engine loading conditions facilitates providing greater assurance that a fault indication for a component is an actual fault indication and/or a true fault indication and/or a non-major fault indication, as opposed to a false indication, or is a true fault indication as opposed to a non-major fault indication, or a non-major fault indication as opposed to a true fault indication.

Additionally, operating at different engine loading conditions can be of assistance in identifying faults when excessive soot production is detected but no fault indication is provided by monitoring equipment. Observation of different engine operating points (such as speed and torque) can be useful in narrowing down a component failure to a narrower group of functions. Data collection over different time frames, such as "long" (e.g., highway driving), "medium" (e.g., regional haul), and "short" (e.g., construction, refuse pickup), where the different applications over these time frames have known expected soot productions rates, can further facilitate identifying possible causes of excessive soot production. Collected data on different soot production rates due to different component failures at different loading conditions can help to identify a group of functions likely to be the cause of the excessive soot production, and may facilitate listing the possible component failures in order of likelihood.

Even when no fault indication is provided by means for monitoring equipment, the inventors have also recognized that when measured actual DPF soot loading exceeds the expected DPF soot loading, this can be indicative of problems sub-optimal performance of one or more components, such as systemic drift in components. For example, increased soot might be produced in circumstances where no single component is malfunctioning to the point where a fault indication is provided, but multiple components are performing in less than optimal levels due to, e.g., wear. Also, frequent or incomplete regenerations that might occur in response to detection of a loaded DPF 27 might indicate poisoning of components such as a DOC 57 or a DPF 27 as well as onset of component failures. Combinations of trouble codes (i.e. where a failure triggers multiple diagnostic codes spread out over several components) can then be used to direct repairs to a correct component, or at least function as a warning of a problem of uncertain origin that requires a service technician to perform more detailed diagnostics to identify the specific source of a problem, rather than always replacing, e.g., the EATS or aftertreatment hydrocarbon injection (AHI) parts. Further, other indications, such as decreased fuel economy or excessive oil usage may, together with an indication that measured actual DPF soot loading exceeds the expected DPF soot loading, assist in confirming that a problem such as a worn part or worn parts exists, and may help in diagnosing the nature of the problem, such as where excessive oil usage may be indicative of a worn piston rings. Diagnosis of a worn part in this manner can be performed in the absence of any fault signal.

Figure 3:
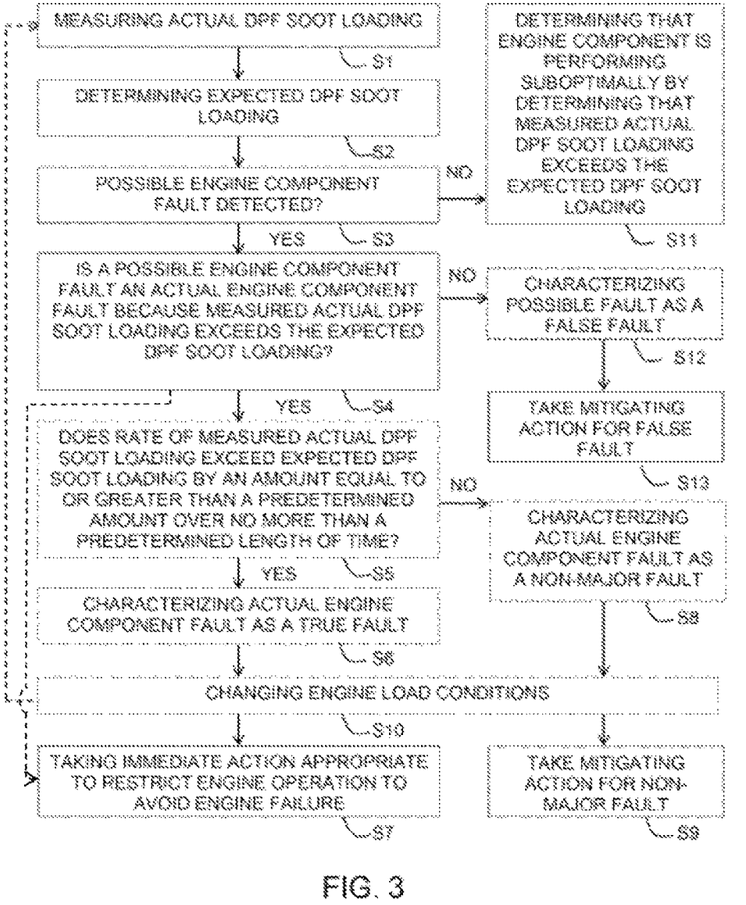
FIG. 3 is a flow chart illustrating steps in a method according to an aspect of the present invention.

A method for assessing engine faults is illustrated in FIG. 3 and comprises a step S1 of measuring actual DPF soot loading with appropriate means 55 for measuring actual soot loading. Expected DPF soot loading is determined in another step S2, such as by the processing circuitry 53 in any one or more of various known ways for determining expected soot loading, such as based on at least one of a combustion model, a soot oxidation loading model, a soot loading map, and computer learned or machine learned soot production expectations (e.g., artificial intelligence) that determines expected soot loading for the particular filter by determining soot loading based on previous experiences or learnings under various engine loading applications.

Monitoring means such as sensors 51 together with the processing circuitry 53 constantly monitor engine component performance to identify possible engine component faults in a step S3.

In another step S4, a determination is made that a possible engine component fault identified by the monitoring means in step S3 is an actual engine component fault by determining that measured actual DPF soot loading exceeds the expected DPF soot loading. The step S4 may involve determining that measured actual DPF soot loading exceeds the expected DPF soot loading by comparing a rate of measured actual DPF soot loading to a rate of expected DPF soot loading. Usually, this step will involve determining that measured actual DPF soot loading exceeds the expected DPF soot loading by greater than a predetermined amount.

After determining that a possible engine component fault is an actual fault at step S4, the method can proceed directly to taking action such as restricting engine operation to avoid engine failure (step S7)(shown by a phantom line) or taking other action to mitigate the effect of the fault at step S9, which step may be chosen, for example, based on the component for which an actual fault has been determined. Ordinarily, however, the severity of the actual fault will be determined at a further step S5, which may involve, for example, determining that the rate of measured actual DPF soot loading exceeds the expected DPF soot loading by an amount equal to or greater than a predetermined amount, e.g., as outlined in fault window ranges determined empirically over no more than a predetermined length of time, e.g., less than one minute. If the actual fault is determined to be sufficiently severe in step S5, the processing circuitry 53 can further characterize the actual fault as a true fault in step S6.

Upon a determination that a determined actual engine component fault is a true fault, a further step S7 can comprise taking immediate action appropriate to restrict engine operation to avoid engine failure. The immediate action can comprise, e.g., using the processing circuitry 53 to at least one of shut the engine down and notify an operator of a true fault and of a severity of the true fault through, e.g., various dash lights, icons, or messages.

If the actual fault is determined to not be sufficiently severe in step S5 and is not characterized as a true fault at step S6, i.e. there is a "NO" at step S5, at a further step S8 the determined actual engine fault can be characterized as a non-major fault, e.g., when the rate of measured actual DPF soot loading exceeds the expected DPF soot loading by less than the predetermined amount e.g., as outlined in fault window ranges determined empirically over no more than a predetermined length of time, e.g., less than one minute. Then, at a further step S9, a response to the determination that a determined actual engine component fault is a non-major fault can comprise taking mitigating action appropriate to ensure correction the non-major fault, such as scheduling service, performing an inspection of the engine 23 and EATS, and/or performing a regeneration of the DPF 27. Additionally, if a fault indication is determined to be a false fault by, for example, the rate of measured actual DPF soot loading, not exceeding the expected DPF soot loading by a threshold predetermined amount necessary to characterize a fault as an actual fault (true or non-major), a mitigating action might involve preventing notification of the driver of the fault indication, and recording the fault indication in processing circuitry (such as an ECU) as a false fault.

The steps of measuring actual DPF soot loading S1, determining expected DPF soot loading S2, and determining that the possible engine component fault is an actual engine component fault by determining that measured actual DPF soot loading exceeds the expected DPF soot loading S4 can be performed at a plurality of engine loading conditions, which can be useful for, inter alia, confirming that a fault is an actual fault. For example, after determining that a possible engine component fault is or is not an actual engine component fault at step S4, the engine loading conditions can be changed at step S10 and the steps S1-S4 can be performed again at the changed loading conditions. Also, after determining that an actual fault is a true engine component fault at step S6, the engine loading conditions can be changed at step S10 and the steps S1-S6 or S1-S8 can be performed again at the changed loading conditions. Also, after determining that an actual fault is a non-major engine component fault at step S8, the engine loading conditions can be changed at step S10 and the steps S1-S6 or S1-S8 can be performed again at the changed loading conditions. In this way, greater assurance as to the characterization of a possible or an actual fault can be provided.

In a further step S11, the processing circuitry 53 can determine that one or more monitored engine components are performing sub-optimally without causing sending of a fault signal by determining that measured actual DPF soot loading exceeds the expected DPF soot loading. This may include determining that measured actual DPF soot loading exceeds the expected DPF soot loading by greater than a predetermined amount, but less than amount that would tend to trigger an indication of an actual fault.

After determining that a possible engine component fault is not an actual fault at step S4, the processing circuitry 53 can characterize the fault as a false fault at step S12, and appropriate mitigating action, such as preventing notification of a fault indication to a driver and recording of a false fault in processing circuitry (such as an ECU) can be taken at step S13.

The method and system according to the present invention can facilitate distinguishing false warning fault signals from actual faults. The method and system can, in addition, facilitate characterizing actual faults as true faults that call for immediate action and non-major faults that are less urgent but call for attention.

The method and system can also facilitate avoiding DPF failures, such as might occur due soot oxidation models or conventional measuring techniques not identifying excessive soot production and attempts to perform active regenerations of overloaded DPFs.

The method and system can also facilitate removal of various exhaust sensing systems that provide only marginal functionality and benefit and that can contribute to expensive warranty claims.

The method and system can also assist in avoiding replacement of good parts while searching for the true root cause of excessive soot production, which can save time and money.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A method for assessing engine faults, comprising:
   measuring a rate of actual diesel particulate filter (DPF) soot loading;
   determining a rate of expected DPF soot loading;
   determining that a possible engine component fault is an actual engine component fault by determining that the rate of measured actual DPF soot loading exceeds the expected DPF soot loading by a first predetermined amount;
   characterizing a possible engine component fault as a false fault when the rate of measured actual DPF soot loading is less than the rate of expected DPF soot loading or exceeds the expected DPF soot loading by an amount less than the first predetermined amount; and
   responding to a determination that a possible engine component fault is a false fault by taking mitigating action appropriate to ensure recordation of the false fault.

2. The method as set forth in claim 1, comprising
   characterizing a determined actual engine component fault as a true limit when the rate of measured actual DPF soot loading exceeds the rate of expected DPF soot loading by an amount equal to or greater than a second predetermined amount, and
   responding to a determination that a determined actual engine component fault is a true fault by taking immediate action appropriate to restrict engine operation to avoid engine failure.

3. The method as set forth in claim 2, wherein the immediate action comprises at least one of shutting the engine down and notifying an operator of a true fault and of a severity of the true fault.

4. The method as set forth in claim 2, comprising
   characterizing a determined actual engine component fault as a non-major fault when the rate of measured actual DPF soot loading exceeds the rate of expected DPF soot loading by less than the second predetermined at amount, and
   responding to a determination that a determined actual engine component fault is a non-major fault by taking mitigating action appropriate to ensure correction of non-major fault.

5. The method as set forth in claim 4, wherein the mitigating action appropriate to ensure correction of the non-major fault comprises performing an inspection of the the DPF.

6. The method as set forth in claim 4, wherein the mitigating action appropriate to ensure correction of the non-major fault comprises performing an inspection of the engine and an exhaust aftertreatment system.

7. The method as set forth in claim 1, comprising the steps of measuring the rate of actual DPF soot loading, determining the rate of expected DPF soot loading, and determining that the possible engine component fault is an actual engine component fault by determining that the rate of measured actual DPF soot loading exceeds the rate of expected DPF soot loading by the first predetermined amount at a plurality of engine loading conditions.

8. The method as set forth in claim 1, wherein the rate of actual DPF soot loading is measured by an RF sensor.

9. The method as set forth in claim 1, wherein the rate of expected DPF soot loading is based on at least one of a soot loading model, a soot loading map, and computer or machine learned soot production expectations.

10. The method as set forth in claim 1, wherein the possible engine component fault is detected by monitoring engine components for faults.

11. The method as set forth in claim 1, comprising diagnosing component wear not constituting an actual fault upon determining that the rate of measured actual DPF soot loading exceeds the rate of expected DPF soot loading by an amount greater than zero but by less than the first predetermined amount, and upon identifying at least one of decreased fuel economy and excessive oil sage.

12. A system for assessing engine faults, comprising:
    means for measuring a rate of actual diesel particulate filter (DPF) soot loading; and processing circuitry configured for determining a rate of expected DPF soot loading, wherein the processing circuitry is configured for
    determining that a possible engine component fault is an actual engine component fault by determining that, the rate of measured actual DPF soot loading exceeds the rate of expected DPF soot loading by a first predetermined amount,
    characterizing a possible engine component fault as a false fault when the rate of measured actual DPF soot loading is less than the rate of expected DPF soot loading or exceeds the rate of expected DPF soot loading by an amount less than the first predetermined amount, and responding to a determination that a possible engine component fault is a false fault by taking mitigating action appropriate to ensure recordation of the false fault.

13. The system as set forth in claim 12, wherein the processing circuitry is configured for
characterizing a determined actual engine component fault as a true fault when the rate of measured actual DPF soot loading exceeds the expected DPF soot loading by an amount equal to or greater than a second predetermined amount, and
responding to a determination that a determined actual engine component fault is a true limit by taking immediate action appropriate to restrict engine operation to avoid engine failure.

14. The system as set forth in claim 13, wherein the immediate action comprises at least one of shutting the engine down and notifying an operator of a true fault and of a severity of the true fault.

15. The system as set forth in claim 13, wherein the processing circuitry is configured for
characterizing a determined actual engine component fault as a non-major fault when the rate of measured actual DPF soot loading exceeds the rate of expected DPF soot loading by more than the first predetermined amount and less than the second predetermined amount, and
responding to a determination that a determined actual engine component fault is a non-major fault by taking mitigating action appropriate to ensure correction of the non-major fault.

16. The system as set forth in claim 15, wherein the mitigating action comprises performing a regeneration of the DPF.

17. The system as set forth in claim 15, wherein the mitigating action comprises performing an inspection of the engine and an exhaust aftertreatment system.

18. The system as set forth in claim 12, wherein the processing circuitry is configured to control the engine to operate at a plurality of different engine loading conditions, the means for measuring the rate of actual DPF soot loading measures the rate of actual DPF soot loading at the different engine loading conditions, the processing circuitry is configured to determine the rate of expected DPF soot loading at the different engine loading conditions, and the processing circuitry is configured for determining that the possible engine component fault is an actual engine component fault by determining that the rate of measured actual DPF soot loading exceeds the rate of expected DPF soot loading at the different engine loading conditions.

19. The system as set forth in claim 12, wherein the means for measuring the rate of actual DPF soot loading comprises an RF sensor.

20. The system as set forth in claim 12, wherein the processing circuitry is configured to determine the rate of expected DPF soot loading based on at least one of a soot loading model, a soot loading map, and computer or machine learned soot production expectations.

21. The system as set forth in claim 12, comprising means for monitoring one or more engine components for faults and for sending a signal to the processing circuitry upon detection of the possible engine component fault.

22. The system as set forth in claim 12, wherein the processing circuitry is configured to diagnose component wear not constituting an actual fault upon determining that the rate of measured actual DPF soot loading exceeds the rate of expected DPF soot loading by an amount greater than zero but by less than a predetermined amount, and upon identifying at least one of decreased fuel economy and excessive oil usage.

23. A method for assessing engine faults, comprising:
measuring a rate of actual diesel particulate filter (DPF) soot loading;
determining a rate of expected DPF soot loading;
monitoring one or more engine components for faults and sending a fault signal upon detection of a possible engine component fault;
determining that one or more monitored engine components are performing sub-optimally without causing sending of a fault signal by determining that the rate of measured actual DPF soot loading exceeds the rate of expected DPF soot loading; and
characterizing a possible engine component fault as a false fault when the rate of measured actual DPF soot loading is less than the rate of expected DPF soot loading or exceeds the rate of expected DPF soot loading by an amount less than a first predetermined amount.

24. A system for assessing engine faults, comprising:
means for measuring a rate of actual diesel particulate filter (DPF) soot loading;
processing circuitry configured for determining a rate of expected DPF soot loading; and
means for monitoring one or more engine components for faults and for sending a fault signal to the processing circuitry upon detection of a possible engine component fault,
wherein the processing circuitry is configured for determining that one or more monitored engine components are performing sub-optimally without causing sending of a fault signal by determining that the rate of measured actual DPF soot loading exceeds the rate of expected DPF soot loading, and for characterizing a possible engine component fault as a false fault when the rate of measured actual DPF soot loading is less than the rate of expected DPF soot loading or exceeds the rate of expected DPF soot loading by an amount less than a first predetermined amount.

* * * * *